United States Patent [19]
Kulp et al.

[11] Patent Number: 5,611,509
[45] Date of Patent: Mar. 18, 1997

[54] QUICK RELEASE MECHANISM FOR A DISPLAY STAND

[75] Inventors: Jack H. Kulp, San Juan Capistrano, Calif.; John D. McKenney, Arroyo Seco, N.M.

[73] Assignee: Traffix Devices, Inc., San Clemente

[21] Appl. No.: 343,342

[22] Filed: Nov. 22, 1994

[51] Int. Cl.⁶ .................................................. F16M 13/00
[52] U.S. Cl. ........................................ 248/188.7; 248/171
[58] Field of Search ................................ 248/188.7, 170, 248/171, 168, 169, 436, 439; 40/610, 612

[56] References Cited

U.S. PATENT DOCUMENTS

| | | |
|---|---|---|
| 134,697 | 1/1873 | Musser . |
| 2,221,932 | 11/1940 | Utley ........................................ 248/439 |
| 2,497,552 | 12/1950 | Ledel . |
| 2,971,803 | 2/1961 | Wallin . |
| 3,291,540 | 12/1966 | Doersam . |
| 3,704,850 | 12/1972 | Hendrickson et al. . |
| 4,548,379 | 10/1985 | Seely et al. . |
| 4,693,444 | 9/1987 | Williams et al. ................... 248/439 X |
| 4,954,008 | 9/1990 | Dicke et al. . |
| 5,082,221 | 1/1992 | Lai ........................................ 248/168 |
| 5,082,222 | 1/1992 | Hsu ........................................ 248/170 |
| 5,102,079 | 4/1992 | Lee .................................... 248/170 X |
| 5,213,296 | 5/1993 | Lee .................................... 248/170 X |
| 5,310,145 | 5/1994 | Chen ..................................... 248/170 |
| 5,340,068 | 8/1994 | Sarkisian et al. . |

FOREIGN PATENT DOCUMENTS 2216438  10/1973  Germany .............................. 248/168

Primary Examiner—Karen J. Chotkowski
Attorney, Agent, or Firm—Donald E. Stout

[57] ABSTRACT

A quick release mechanism is provided for securing a member to a structure, such as a support leg to a sign stand, wherein the member includes a slot having a bottom surface and the structure has a slot having an open top end. A latch member releasably attaches the member to the structure, and is adapted to extend axially through both the member and structure slots, so that a proximal portion of the latch member extends forwardly of the member slot and a distal portion of the latch member extends rearwardly into the structure slot. With this arrangement, when the latch member proximal portion is actuated downwardly, the latch member distal portion swings upwardly through the open top end of the structure slot, thereby disengaging from the structure slot and releasing the member so that it may pivot relative to the structure.

26 Claims, 2 Drawing Sheets

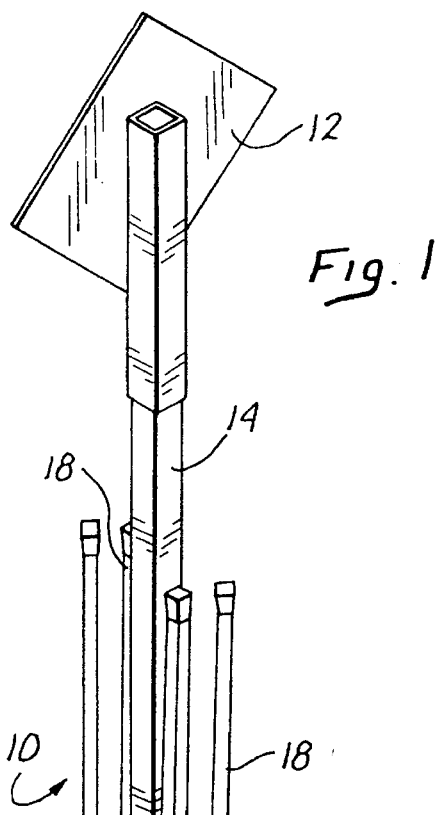
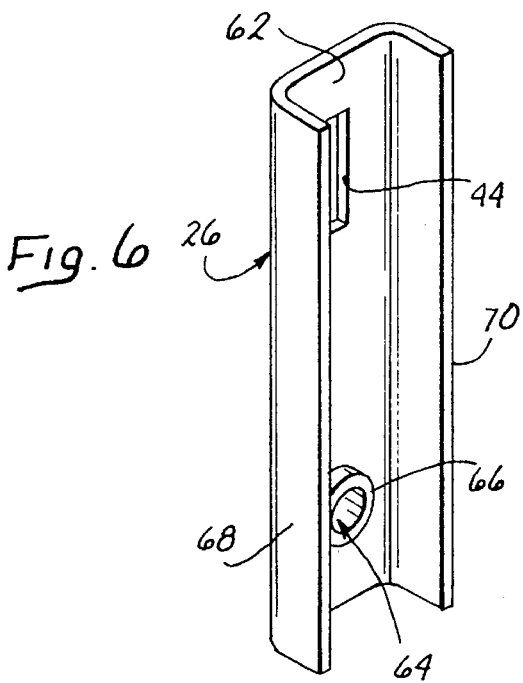
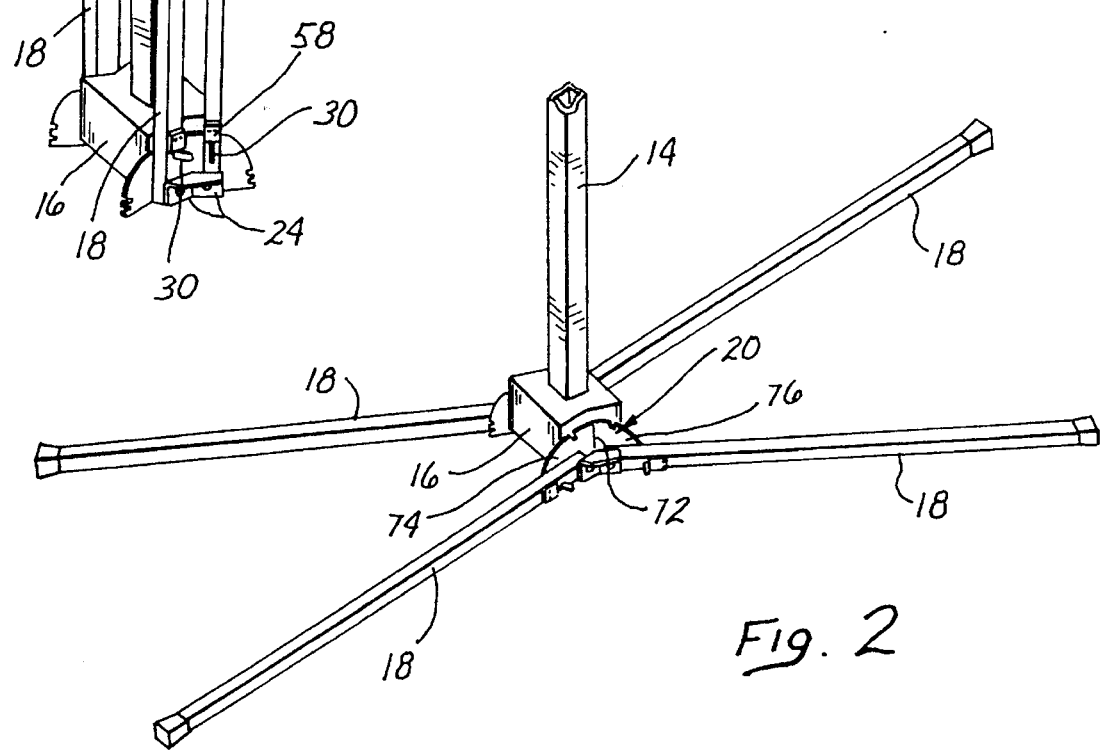

QUICK RELEASE MECHANISM FOR A DISPLAY STAND

BACKGROUND OF THE INVENTION

This invention relates to a quick release mechanism for pivotally joined tube members and more particularly for use on foldable legs attached to supporting structures for signs, barriers, and the like.

There are many occasions when it is desirable to releasably attach a tube or the like to a structure. For example, a number of tubular legs are required to support a stand upon which an outdoor sign for conveying a message to passing motorists may be mounted. Frequently, the need is temporary, and it is therefore advantageous to have support stands for such signs which may be readily assembled and disassembled with very little effort on the part of the worker.

Often, such support stands comprise a base from which the mast to which the sign is attached extends upwardly. A plurality of legs, usually four, are pivotally attached to the base by means of bolts or similar fasteners, which extend through fastener holes in the legs and the stand base. The legs are each designed to pivot about the shank of their corresponding fastener from a folded, upright position for compact storage and easy transportability to an extended deployed position for supporting the sign. In both the folded and the extended positions each leg is fixedly attached to the base to prevent undesired pivoting. These attachments are removed when it is desired to pivot the legs from one position to the other, after which they are replaced.

Heretofore, such attachments have been accomplished using removable pins, bolts, clips, or by being manually tied upright. Most typically used presently are removable pin assemblies. In one such assembly, one pin is associated with each leg, usually by means of a chain or the like, so that it does not become lost. To fix the leg with respect to the stand in either the stowed or deployed position, the pin is manually inserted through a hole in the leg and engaged with a corresponding hole in the base plate of the stand. When it is desired to pivot the leg between the two positions, the pin is removed from the holes so that the leg is free to pivot about the pivotable connection between the leg and the stand base plate. Another pin assembly employs a spring biased pull pin for each leg, wherein the pin is attached to a coil spring within the tube leg. To lock the leg to the base plate of the stand, an opening in the leg is selectably aligned with one of the openings in the base plate of the stand, and the spring loaded pull pin is forced inwardly through the openings into the engaged position. The pull pin is unlocked by pulling it out of the opening.

Such attachment schemes, while effective, are relatively time consuming to operate, and involve a great deal of effort on the part of the Worker. In many cases a worker will have to bend over to release each of the four legs individually. This is potentially hazardous, since it diverts his concentration from the passing vehicular traffic. He also may have to remove his gloves to manipulate the pull pins.

U.S. Pat. No. 4,954,008 to Dicke et al discloses an alternative attachment arrangement which also utilizes a locking pin, as in the previously discussed arrangements, but further includes a leaf spring biased lever arm attached to the proximal end of the pin (that end which is closest to the worker). This handle permits the worker to depress the handle end of the lever arm to actuate the pin out of the hole in the stand base plate, thereby pivotally releasing the leg from the base plate. The bias of the leaf spring on the lever arm will return the pin to the engaged position as soon as the lever arm is released by the worker and the pin is aligned with a hole in the stand. This arrangement is an improvement over the previous methods, but still requires considerable effort on the part of the worker to engage the lever arm and depress it to release the leg. The worker must either bend over to squeeze it with his hand, or, with a fairly coordinated effort, push and depress the lever arm with his foot sufficiently to disengage the pin from the hole. Furthermore, it is necessary to repeat this effort four times in order to individually release all of the legs.

Another problem common to sign stands of the type described is the effect of repeated pivoting of the legs on the thin metal leg outer walls about the circumference of the fastener holes. Typically, the sign stands are roughly handled by the personnel responsible for setting them up and taking them down, with the legs being pivoted forcefully between the stowed and deployed positions. The applied force, combined with constant loading and unloading forces caused by wind and passing vehicles, causes the fastener shanks to contact the inner circumference of the fastener hole through the thin leg wall, causing rapid wear and elongation of the metal, until the fit of the shank within the elongated hole is so loose that the sign stand becomes wobbly. As this wear continues, the stand will eventually become unusable unless the leg with the elongated fastener hole is replaced. Replacing the legs is relatively expensive and inconvenient compared to the cost of replacing the entire sign stand, meaning that the wear of the leg fastener holes is usually the critical factor in determining the useful life of the stand.

What is needed, therefore, is a simple quick release mechanism which eliminates much of the repetitive effort on the part of the worker, and also requires simpler (and thus, safer), less complex motions than are required to actuate current leg release mechanisms. Additionally, some means for reducing wear of each leg fastener hole is necessary to increase the life span of the stand and thereby reduce expense.

SUMMARY OF THE INVENTION

This invention solves the problems described above by providing a sign stand having a quick release mechanism which is simple, easy to operate using one foot without the necessity of bending over, and permits the simultaneous release of two of the legs from the stand base. Furthermore, a simple means is provided for protecting the inner circumferences of the leg fastener holes, so that wear of the thin metal wall is prevented and the useful life of the sign is substantially increased.

More specifically, a quick release mechanism is provided for securing a member to a structure, wherein the member includes a slot having a lower surface and the structure has a slot having an open upper end. A latch member provides the means for releasably attaching the member to the structure, and is adapted to extend axially through both the member and structure slots, so that a proximal portion of the latch member extends proximally of the member slot and a distal portion of the latch member extends distally into the structure slot. With this arrangement, when the latch member proximal portion is depressed, the latch member distal portion swings upwardly through the open top end of the structure slot, thereby disengaging from the structure slot and releasing the member so that it may pivot relative to the structure.

In another aspect of the invention, a stand for supporting a sign or the like is provided which comprises a base and a plurality of legs pivotally attached to the base. The legs are pivotable from a first stowed position to a second deployed position, wherein more than one of the legs are capable of being simultaneously released from the stand by a single motion of a single actuating element, so that they may pivot from the first position to the second position. Preferably, the single actuating element is a human foot, and the single motion is a generally downward stepping motion of the foot.

In yet another aspect of the invention, a stand for supporting a sign or the like is provided which comprises a base, a leg pivotally attached to the base, pivotable from a first stowed position to a second deployed position, and a quick release mechanism for securing the leg to the base. The quick release mechanism is comprised of a slot in the leg, which has a lower surface, a slot in the base, which has an open upper portion, and a latch member adapted to extend axially through the leg and base slots. Consequently, a proximal portion of the latch member extends proximally of the leg slot and a distal portion of the latch member extends distally into the base slot. In operation, when the latch member proximal portion is actuated downwardly, the latch member pivots about the lower surface of the leg slot sufficiently that the latch member distal portion swings upwardly through the open upper end of the base slot, thereby disengaging from the base slot and releasing the leg so that it may pivot relative to the base.

In still another aspect of the invention, there is provided a stand for supporting a sign or the like, which includes a base having a first fastener hole, a leg having a second fastener hole, and a reinforcing channel arranged between the leg and the base and having a third fastening hole. All three fastener holes are in substantial alignment. Further included is a fastener having a shank which extend through the first, second, and third fastener holes for pivotally attaching the leg to the base. A boss integral with the reinforcing channel surrounds and extends through the second fastener hole. It is thus positioned to contact the fastener shank, rather than the inner circumference of the second fastener hole, consequently practically eliminating wear of the sign stand leg due to repeated rough pivoting of the legs, and forces caused by windy conditions and passing vehicular traffic.

The invention, together with additional features and advantages thereof, may best be understood by reference to the following description taken in conjunction with the accompanying illustrative drawing.

BRIEF DESCRIPTION OF THE DRAWINGS

FIG. 1 is a perspective view of a sign support stand which employs a quick release mechanism constructed in accordance with the principles of the invention, illustrating the sign stand support legs in a folded, secured storage position;

FIG. 2 is a fragmentary perspective view of the sign support stand of FIG. 1, illustrating the sign support legs in a released deployed position;

FIG. 6 is a perspective view in isolation of a reinforcing channel for a sign support stand leg, which forms a part of the embodiment illustrated in FIGS. 1–4.

DESCRIPTION OF THE PREFERRED EMBODIMENT

Figure 3:
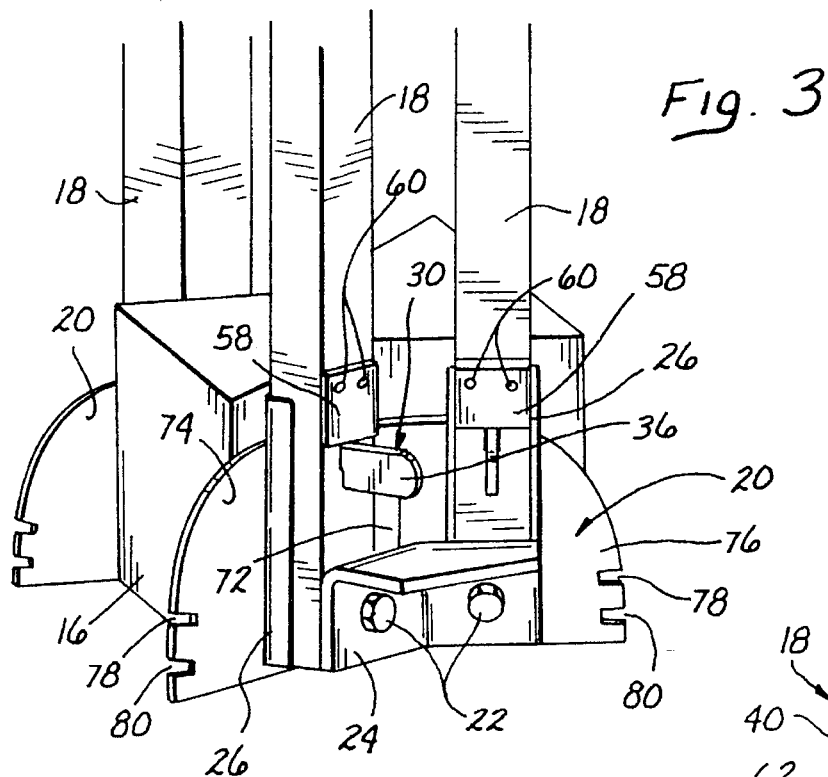
FIG. 3 is a fragmentary enlarged perspective view of the quick release mechanism illustrated in FIG. 1, showing the sign stand support legs in their stowed secured position.

Referring now more specifically to the drawings, in FIG. 1 is illustrated a stand 10 for supporting a sign 12 to display messages to passing motorists. The sign 12 may be mounted on a mast 14, which at its lower end is attached to a base 16, of any known construction. Typically, the base may include yieldable members such as springs for ensuring that the sign will deflect in high wind conditions and return to an upright position, though such a feature is not required for the invention, and many other types of bases and sign attachments may be utilized. Also attached to the base 16 are a plurality of legs 18, preferably four, which may be folded into an upright, compact storage position for transportation and storage of the sign stand (FIG. 1 ), or may be pivoted to an extended deployed position to support the stand (FIG. 2).

Figure 5:
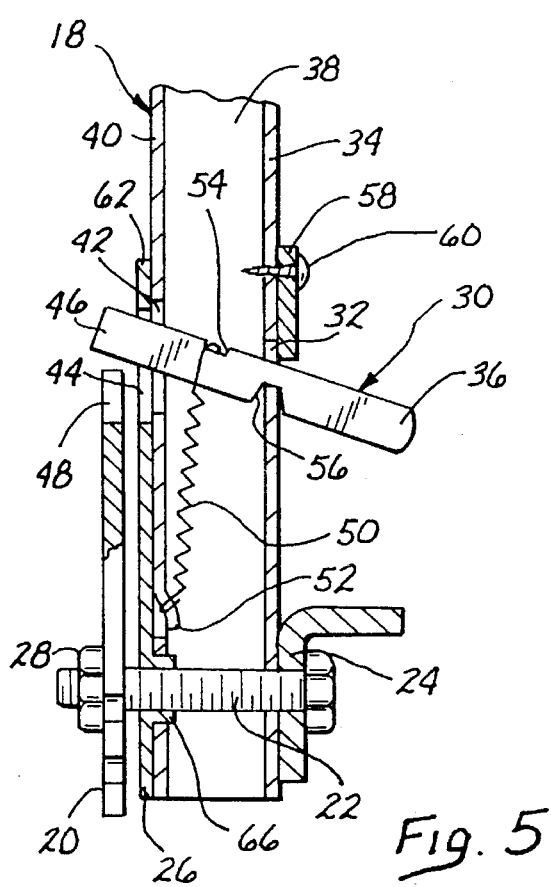
FIG. 5 is a cross-sectional view similar to FIG. 4, illustrating the quick release mechanism after it has been actuated to its released position.
Figure 4:
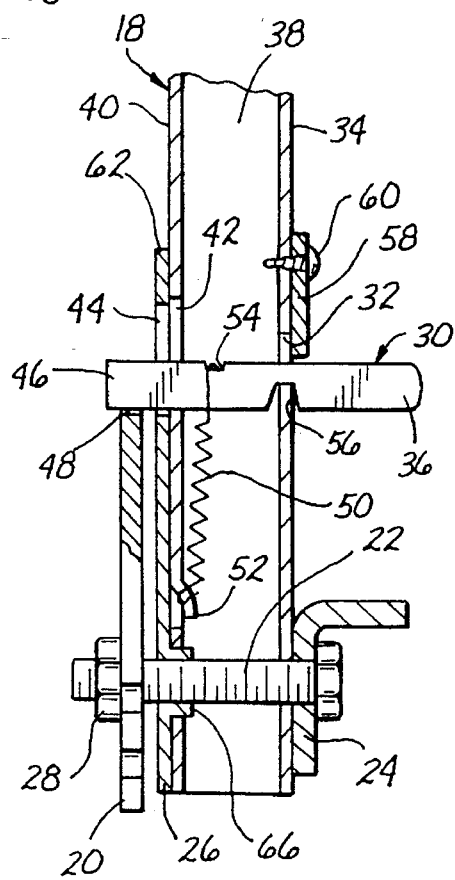
FIG. 4 is a cross-sectional view of one of the sign stand support legs illustrated in FIG. 3, showing in detail the quick release mechanism of the invention when the legs are in their folded, secured storage position.

Now with further reference to FIGS. 3, 4, and 5, the inventive quick release mechanism for releasing the legs 18 from their upright stowed position to their extended deployed position will be more particularly described. FIG. 3 illustrates in greater detail the base portion of the sign stand 10 shown in FIG. 1. In the preferred embodiment, a pair of arcuate base plates 20 are attached to the base 16, preferably at their respective centers by known means, such as by welding. Two of the legs 18 are fixedly attached to each of the front and rear base plates 20, preferably using known fastening hardware, such as bolts 22, one of which extends through each of the four legs 18, a fastener plate 24 and a reinforcing channel 26. A nut 28 is tightened onto the threaded distal end of the bolt, against the back side of the base plate 20. Each leg 18 is preferably fabricated from extruded metal tubing having a square cross-section, though other materials and configurations may be employed as well.

A latch bar 30 is arranged to extend through a first slot 32 in the front outer wall portion 34 of each leg 18, so that a proximal portion 36 of the latch bar 30 extends forwardly (or proximally) of the wall portion 34, as illustrated. The remainder of the latch bar 30 extends rearwardly (or distally) through the interior space 38 between the front outer wall portion 34 and a rear outer wall portion 40 of the leg 18, and through a second slot 42 in the rear outer wall portion 40, as well as yet a third slot 44 in the reinforcing channel 26. As of the reinforcing channel 26, a distal portion 46 of the latch bar 30 extends into a first open base plate slot 48. A spring 50 is attached at an upper end to the latch bar 30, and at a lower end to the leg 18, preferably on an inwardly protruding tab 52 on the rear outer wall portion 40, as illustrated in FIGS. 3 and 4. An upper groove 54 is preferably provided in the top surface of the latch bar 30 to seat the spring, as illustrated. The spring functions to bias the latch bar 30 into the position shown in FIG. 4.

The latch bar 30 further includes a lower groove 56 on its lower surface (FIGS. 4 and 5), which is located and configured to cause the latch bar 30 to pivot about the front outer wall portion 34 which bounds the lower edge of the first slot 32, as illustrated in FIGS. 4 and 5. A stop plate 58 is fastened to the front outer wall portion 34 of each leg 18, and located to overhang the upper portion of the first slot 32, so that the proximal portion 36 of the latch bar 30 ultimately abuts the stop plate 58 when pivoting upwardly from the position shown in FIG. 5 to the position shown in FIG. 4. The stop plate 58 thereby prevents the latch bar from being lifted up and out of its pivoting position in slot 32. The stop plate 58 may be attached using mechanical fasteners, such as machine screws 60, as illustrated, or alternatively by other known fastening means, such as by welding or brazing, and is positioned to stop upward motion of the latch bar proximal portion 36 before it disengages from the front outer wall portion 34 of the leg. The upper portion 62 of the reinforcing channel 26 acts as a rear stop by abutting the distal portion 46 of the latch bar 30 and thereby halting its upward motion as it pivots upwardly from the position shown in FIG. 4 to the position shown in FIG. 5.

Referring now to FIG. 6, the reinforcing channel 26 for each leg 18 is illustrated in greater detail, including the slot 44 and the upper stop portion 62. Another important feature of the invention is associated with a fastener hole 64 in a lower end of the channel 26, which is adapted to receive the bolts 22, as illustrated particularly in FIGS. 4 and 5. Significantly, the fastener hole 64 comprises a boss or shoulder portion 66 of the channel 26, which extends proximally (inwardly) in the same direction as the two channel sidewalls 68 and 70. This inventive feature solves a longstanding problem in the art; i.e. wear in the rear outer wall portion 40 of the leg 18 at the site of the bolt hole through the wall portion. As described in the Background of the Invention, this wear in the thin leg wall portion is caused by repeated pivoting of the leg 18 as the stand is set up and taken down by construction workers using the equipment, as well as wind loading and unloading forces on the stand, and results in an increasingly wobbly, loose connection of the leg to the base plate. The boss 66 extends through the bolt hole in the wall portion 40, as shown in FIGS. 4 and 5, to reinforce the hole, so that substantially no wear occurs in the wall 40. The reinforcing channel, and thus the deep drawn boss itself, is formed of sufficiently thick stock material, such as steel, preferably having a thickness within a range of about 0.100 to 0.125 inches, that it is highly resistant to wear caused by repeated pivoting of the leg 18. Furthermore, if the boss at some point in time does become worn, the reinforcing channel 26 may be replaced at relatively low cost, so that a new boss is inserted into the outer wall portion boss hole. This inventive feature greatly increases the service life of a typical sign stand, since it is typically not cost effective to replace the legs when substantial wear has occurred. Furthermore, it is useful in any pivotable fastener or locking connection in a sign stand, whether or not the sign stand includes the latch bar release or pull pin feature also herein described.

As best seen in FIG. 3, each base plate 20 preferably has an arcuate configuration, which in the preferred embodiment is substantially hemispherical, having a center bend portion 72 and two planar attachment portions 74 and 76, each oriented at a predetermined angle relative to each other and the center bend portion. The purpose of the angled orientation will be explained hereinbelow.

As described above, each planar portion 74, 76 of the base plate 20 includes a first base plate slot 48, which receives the associated latch bar distal portion 46 when the leg is latched into its upward stowed position, as shown in FIG. 3. However, each base plate planar portion further includes second and third base plate slots 78 and 80 (FIG. 3) at selected circumferential locations thereon, for receiving the latch bar distal portion when the leg is pivoted to a sign deployment position. The second slot 78, which is higher with respect to the ground than the third slot 80, is most typically used, resulting in a relatively flat orientation of the legs 18, as shown in FIG. 2. This relatively flat orientation is preferred, because the legs 18 are often stepped on and occasionally driven over while deployed, and the relatively flat orientation permits the base plates 20 to bottom onto the supporting ground surface before the legs 18 or the latch bar 30 are significantly bent. The third slot 80 is used to obtain greater sign height, or when the sign is to be placed on uneven terrain, such as the tapered shoulder of a roadway or curb, to level the sign to the extent possible. The distal portion of the latch bar 46 is received by the second and third slots 78, 80 in the same manner as it is received by the first slot 48 when the legs are in a stowed position.

In operation, a sign stand 10 will typically be in a stowed position, with the four legs 18 latched into an upright configuration, as illustrated in FIG. 1. Once the sign has been transported to the job site, where it is to be displayed, a worker may lift the sign stand from the truck and carry it to the desired display location, setting it down so that the base 16 rests on the ground or road surface. Then, to release the legs 18 from their upright stowed position, the worker preferably uses the toe or toes of his foot to step downwardly on the latch bar proximal portion 36 of each leg, thereby lifting the distal portion 46 of the latch bar upwardly out of the first slot 48 in the corresponding planar portion 74, 76 of the base plate 20. Once the leg 18 is released, the worker pushes it to the ground, and it drops downwardly, pivoting about the bolt 22. As the leg starts to drop, the worker lifts his foot off of the proximal portion 36 of the latch bar, so that the spring 50 causes the distal portion 46 of the latch bar to return to a position wherein it is resting atop the circumferential surface of the base plate planar portion, until the leg 18 travels sufficiently far around the base plate circumference so that the distal portion 46 reaches a point just above the second slot 78 in the base plate 74. At this juncture, a lifting force created by grasping and lifting the mast 14 permits the leg 18 to travel circumferentially the remaining distance to the slot 78, and the biasing force applied by the spring 50 causes the distal portion 46 to drop into the slot, thereby latching the leg 18 into its deployed position. The leg is thus fixed in position to sturdily support the sign stand, even in adverse high-wind conditions. If it is desired to use the third slot 80, in order to raise the height of the sign or to compensate for uneven terrain, the proximal portion 36 of the latch bar may be actuated again, either using a foot or a hand, to release the distal portion 46 from the second slot, in the same manner described above with respect to the first slot 48. Then, the leg may be pivoted so that the distal portion 46 drops into the third slot 80, again because of the biasing force exerted by the spring 50.

To return the sign stand to a compact stowed position, as illustrated in FIG. 1, the proximal portion 36 of each latch bar is depressed again, in order to release the latch bar from the second or third slot (78 or 80, respectively). Then, each leg 18 is lifted upwardly so that the leg again pivots about the bolt 22, with the distal portion of the now released latch bar contacting the circumferential surface of the corresponding base plate planar portion as it travels therealong in a clockwise direction. Once the distal portion reaches the first slot 48, it drops therein, due again to the biasing force exerted by the spring 50. The leg 18 is now in its upright stowed position.

A particularly important, advantageous feature of the invention is that two adjacent latch bars 30 may be actuated simultaneously, which renders the process of setting up a sign even more efficient and convenient. This feature is possible because, as described previously, the two planar portions 74 and 76 of each base plate 20 are arranged at a predetermined angle with respect to one another and with respect to the center bend portion 72. Consequently, the two latch bars 30 which are disposed in the adjacent legs attached to one of the base plates 20 are also arranged at the same predetermined angular orientation with respect to one another and with respect to the center bend portion, as is best illustrated in FIG. 3. The sign stand is designed so that the two adjacent latch bars 30 on each side of the base 16 are angled toward one another sufficiently closely to ensure that a worker may step downwardly on the two latch bars simultaneously with a single foot. In the preferred embodiment, this angle between the orientation of each planar portion and the center bend portion is approximately 55 degrees, though various angles may be employed, depending upon the length of the latch bars and the footprint or distance of the two legs from one another. In some embodiments, it may not be necessary to angle the latch bars, because they are sufficiently close together, and the predetermined angle may be 0 degrees. The important consideration is that the proximal latch bar portions must be arranged to be sufficiently close to permit simultaneous actuation with a single motion of a worker's toe, foot, hand, or other actuation device.

Thus, the inventive stepping feature permitting the release of two of the four legs simultaneously permits much easier and more rapid deployment of the sign stand than was possible in the prior art stands, which required individual actuation of each leg.

Accordingly, although an exemplary embodiment of the invention has been shown and described, it is to be understood that all the terms used herein are descriptive rather than limiting, and that many changes, modifications, and substitutions may be made by one having ordinary skill in the art without departing from the spirit and scope of the invention. The scope of the invention should therefore be determined only in accordance with the appended claims.

What is claimed is:

1. An apparatus comprising a member, a structure, and a quick release mechanism, and having a lower portion for supporting the apparatus and an upper portion for supporting an object, said apparatus comprising:

a slot in said member, said member slot having a lower surface;

a slot in said structure, said structure slot having an upper portion which is open; and a latch member adapted to extend axially through said member and structure slots, such that a proximal portion of the latch member extends proximally of said member slot and a distal portion of the latch member extends distally into said structure slot, the latch member pivotably resting on said member slot lower surface;

whereby when said latch member proximal portion is depressed, the latch member pivots about the lower surface of said member slot sufficiently that the latch member distal portion swings upwardly through the open top end of the structure slot, thereby disengaging from the structure slot and releasing said member so that it may pivot relative to said structure.

2. The apparatus as recited in claim 1, wherein said structure comprises a stand for supporting said object and said member comprises a leg for supporting said stand.

3. The apparatus as recited in claim 2, wherein said leg is pivotally attached to said stand, and is adapted to be folded upwardly in a compact stowed position when secured to said stand, such that when the leg is released so that it may pivot relative to said stand, it is adapted to pivot downwardly to an extended fixed supporting position.

4. A quick release mechanism as recited in claim 1, wherein there are a plurality of said members pivotally attached to said structure.

5. A quick release mechanism as recited in claim 4, wherein a plurality of said members may be pivotally released from the structure simultaneously.

6. A stand for supporting a sign or the like, said stand comprising:

a base; and a plurality of legs pivotally attached to said base, said legs each having a proximal side and a distal side and being pivotable from a first stowed position to a second deployed position; and means for simultaneously releasing more than one of said legs from said stand by a single motion of a single actuating element, so that the legs may pivot from said first position to said second position.

7. A stand as recited in claim 6, wherein said single actuating element is a human foot and said single motion is a generally downward stepping motion of said foot.

8. A stand as recited in claim 6, wherein said legs are arranged in pairs on opposing sides of said base, and each of said pairs of legs may be simultaneously pivotally released from said stand by said simultaneously releasing mean.

9. A stand as recited in claim 8, said stand further including a quick release mechanism associated with each of said legs, said quick release mechanism comprising a latch member having a proximal portion protruding from the proximal side of each said leg and a distal portion adapted to engage said stand to fix the relative position of said leg with respect to said stand, said proximal latch member portion being adapted to be depressed to release said distal latch member portion from said stand.

10. A stand as recited in claim 9, wherein the latch members protruding from each pair of legs are adapted to be simultaneously depressed by said single motion of said single actuating element, thereby simultaneously pivotally releasing each one of said pair of legs from said stand.

11. A stand as recited in claim 10, wherein the latch members protruding from each pair of legs are angularly oriented toward one another, whereby the respective proximal portions of each of said latch members are relatively closely spaced with respect to the respective distal portions of each of said latch members.

12. A stand for supporting a sign or the like, said stand comprising:

a base;

a leg pivotally attached to said base, said leg being pivotable from a first stowed position to a second deployed position; and a quick release mechanism for securing said leg to said base, said mechanism comprising:

a slot in said leg, said slot having a lower surface;

a slot in said base, said base slot having an upper portion which is open; and a latch member adapted to extend axially through said leg and base slots, such that a proximal portion of the latch member extends proximally of said leg slot and a distal portion of the latch member extends distally into said base slot;

whereby when said latch member proximal portion is depressed, the latch member pivots about the lower surface of said leg slot sufficiently that the latch member distal portion swings upwardly through the open top end of the base slot, thereby disengaging from the base slot and releasing said leg so that it may pivot relative to said base.

13. A stand as recited in claim 12, said stand further comprising a base plate, said base plate having an arcuate configuration and a circumferential surface, said circumferential surface including a plurality of said base slots therein, wherein each said base slot is adapted to receive the latch member distal portion when said leg is in a particular latched position, such that when said leg is in said first stowed position and the distal portion is released from one of said base slots, said leg can pivot in a direction such that the distal portion thereof traverses said circumferential surface until it reaches a second one of said base slots, whereupon it is adapted to be received therein to fix said leg in said second deployed position.

14. A stand as recited in claim 13, and further comprising a plurality of legs, wherein said base plate includes first and second attachment portions, said attachment portions being oriented at a predetermined angle relative to one another, each of said attachment portions being pivotally attached to a corresponding leg and having a plurality of said plate slots.

15. A stand as recited in claim 14, wherein said stand further comprises two of said arcuate base plates, arranged on opposing sides of said base, each of said base plates being pivotally attached to a pair of said legs.

16. A stand as recited in claim 15, wherein the predetermined angle between the attachment portions of each base plate causes the two latch members associated with the pair of legs pivotally attached to the base plate to have substantially the same angular orientation with respect to one another, so that the proximal portions of each said latch member are spaced more closely than the distal portions thereof.

17. A stand as recited in claim 16, wherein the latch member proximal portions of each pair of legs are adapted to permit their simultaneous depression by a single motion of a single actuating element, such that the latch member distal portions may be simultaneously released from their corresponding base plate.

18. A stand as recited in claim 17, wherein said single actuating element is a human foot and said single motion is a generally downward stepping motion of said foot.

19. A stand as recited in claim 12, and further comprising a plurality of legs, wherein said legs are adapted to be pivoted upwardly into said first stowed position, such that when the legs are released so that they may pivot relative to the stand, they are adapted to pivot downwardly to an extended fixed supporting position.

20. A stand as recited in claim 12, wherein said latch member is biased against depressed, to thereby retain the latch member distal portion engaged in said base slot in the absence of a depressing force on said proximal portion.

21. A stand as recited in claim 12, wherein said leg is hollow, comprising a first outer wall portion, an opposing second outer wall portion, and an interior space between said first and second outer wall portions, said leg slot comprising a first slot in said first outer wall portion, said stand further comprising a second slot in said second outer wall portion, wherein said latch member is adapted to extend axially through said first, second, and base slots, such that the latch member proximal portion extends proximally of said first slot and the latch member distal portion extends into said base slot;

whereby when said latch member proximal portion is depressed, the latch member pivots about the lower surface of said first slot.

22. A stand as recited in claim 21, and further comprising a spring located in said interior space, said spring being attached at an upper end to said latch member and at a lower end to the interior of said hollow leg and functioning to bias said latch member against depression of said proximal portion.

23. A stand as recited in claim 21, and further comprising a groove in the lower surface of said latch member for receiving the lower surface of said first slot so that the latch member may pivot thereabout, and a stop plate which is attached to said first outer wall portion and is adapted to overhang the upper portion of said first slot, said stop plate being adapted to prevent the disengagement of said latch member groove from said first slot bottom surface.

24. A stand as recited in claim 21, and further comprising a reinforcing channel positioned between said leg and said base and which is sized and adapted to closely surround and reinforce a portion of said second outer wall portion, said reinforcing channel having a slot therein in axial alignment with said second slot and said base slot and having a upper surface, for receiving said latch member, the upper surface of said reinforcing channel slot being adapted to stop upward travel of said latch member distal portion.

25. A stand as recited in claim 12, and further comprising:
   a fastener having a shank extending through aligned fastener holes in said leg and said base to pivotally attach said leg and said base; and
   a reinforcing channel located between said leg and said base and being adapted to reinforce said leg, said reinforcing channel including a fastener hole which is substantially aligned with said leg and base fastener holes and further including a boss surrounding said reinforcing channel fastener hole and extending proximally through said leg fastener hole, said boss thereby being positioned for contacting relationship with said fastener shank so that the circumference of the leg fastener hole is prevented from contacting the shank, such that the leg fastener hole does not become worn from repeated pivoting of said leg with respect to said base.

26. A stand for supporting a sign or the like, said stand comprising:
   a base having a first fastener hole therethrough;
   a leg having a second fastener hole therethrough, said leg fastener hole being in substantial alignment with said base fastener hole;
   a reinforcing channel between said leg and said base, said reinforcing channel having a third fastener hole therethrough, said third fastener hole being in substantial alignment with said first and second fastener holes;
   a fastener having a shank which extends through said first, second and third fastener holes for pivotally attaching said leg to said base; and
   a boss integral with said reinforcing channel and surrounding said third fastener hole, said boss extending from said reinforcing channel through said second fastener hole and thereby being positioned for contacting relationship with said fastener shank so that the second fastener hole is prevented from contacting the shank of the fastener such that the circumference of the second fastener hole does not become worn from repeated pivoting of said leg with respect to said base.

* * * * *